United States Patent
Matsumoto et al.

(10) Patent No.: US 8,410,224 B2
(45) Date of Patent: Apr. 2, 2013

(54) METHOD FOR PRODUCING MODIFIED CONJUGATED DIENE BASED (CO)POLYMER, MODIFIED CONJUGATED DIENE BASED (CO)POLYMER, AND RUBBER COMPOSITION

(75) Inventors: Takaomi Matsumoto, Tokyo (JP); Masahiro Shibata, Tokyo (JP); Takuo Sone, Tokyo (JP); Toshihiro Tadaki, Tokyo (JP); Ken Tanaka, Kodaira (JP); Ryuji Nakagawa, Kodaira (JP)

(73) Assignees: JSR Corporation, Tokyo (JP); Bridgestone Corporation, Tokyo (JP)

( * ) Notice: Subject to any disclaimer, the term of this patent is extended or adjusted under 35 U.S.C. 154(b) by 180 days.

(21) Appl. No.: 12/532,720

(22) PCT Filed: Mar. 21, 2008

(86) PCT No.: PCT/JP2008/055339
§ 371 (c)(1),
(2), (4) Date: Jan. 14, 2010

(87) PCT Pub. No.: WO2008/123163
PCT Pub. Date: Oct. 16, 2008

(65) Prior Publication Data
US 2010/0113683 A1 May 6, 2010

(30) Foreign Application Priority Data

Mar. 23, 2007 (JP) .................. 2007-077964

(51) Int. Cl.
C08F 36/00 (2006.01)
C08C 19/00 (2006.01)
C08C 19/12 (2006.01)
C08C 19/22 (2006.01)

(52) U.S. Cl. .............. 525/331.9; 525/342; 525/355; 525/374

(58) Field of Classification Search .............. 524/495, 524/492, 588; 525/331.9, 271, 242, 475, 525/342, 374
See application file for complete search history.

(56) References Cited

U.S. PATENT DOCUMENTS

| | | | |
|---|---|---|---|
| 5,096,942 A | 3/1992 | Long et al. | |
| 5,310,798 A | 5/1994 | Lawson et al. | |
| 2004/0254301 A1* | 12/2004 | Tsukimawashi et al. | 525/271 |
| 2005/0020757 A1* | 1/2005 | Ozawa et al. | 524/492 |
| 2005/0159554 A1 | 7/2005 | Endou et al. | |
| 2008/0015309 A1 | 1/2008 | Ozawa et al. | |
| 2008/0045664 A1 | 2/2008 | Sone et al. | |
| 2008/0103261 A1 | 5/2008 | Tanaka et al. | |

FOREIGN PATENT DOCUMENTS

| | | |
|---|---|---|
| JP | 56 104906 | 8/1981 |
| JP | 3 504026 | 9/1991 |
| JP | 5 500389 | 1/1993 |
| JP | 7 149825 | 6/1995 |
| JP | 2005 298626 | 10/2005 |
| RU | 2 058 322 C1 | 4/1996 |
| RU | 95104883 | 1/1997 |
| WO | 03 029299 | 4/2003 |
| WO | 03 048216 | 6/2003 |
| WO | 03 087171 | 10/2003 |
| WO | 2008 050845 | 5/2008 |
| WO | 2008 050851 | 5/2008 |

OTHER PUBLICATIONS

U.S. Appl. No. 12/532,764, filed Sep. 23, 2009, Shibata, et al.
U.S. Appl. No. 12/531,346, filed Sep. 15, 2009, Tadaki, et al.
Russian Office Action issued Dec. 16, 2011, in Patent Application No. 2009139078/05.
Russian Search Report issued Mar. 18, 2011, in Patent Application No. 2009139078/05.
U.S. Appl. No. 13/347,115, filed Jan. 10, 2012, Shibata, et al.

* cited by examiner

Primary Examiner — Ling Choi
Assistant Examiner — Monique Peets
(74) Attorney, Agent, or Firm — Oblon, Spivak, McClelland, Maier & Neustadt, L.L.P.

(57) ABSTRACT

The method for producing a modified conjugated diene based (co)polymer, according to the present invention comprises
(a) obtaining a primarily modified polymer by carrying out a primary modification reaction wherein at least one member selected from the group consisting of an alkoxysilane compound and a silanol compound is introduced into the active alkali metal terminal of a conjugated diene based (co)polymer having an active alkali metal terminal, and
(b) obtaining a secondarily modified polymer (a modified conjugated diene based (co)polymer) by subjecting the above-obtained primarily modified polymer to reactions comprising (b1) and (b2).
(b1): a reaction with a condensation accelerator comprising a metal element.
(b2): a reaction with at least one member selected from the group consisting of inorganic acids and metal halides.

20 Claims, No Drawings

METHOD FOR PRODUCING MODIFIED CONJUGATED DIENE BASED (CO)POLYMER, MODIFIED CONJUGATED DIENE BASED (CO)POLYMER, AND RUBBER COMPOSITION

TECHNICAL FIELD

The present invention relates to a method for producing a modified conjugated diene based (co)polymer, a modified conjugated diene based (co)polymer and a rubber composition. More particularly, the present invention relates to a method for producing a modified conjugated diene based (co)polymer, which enables production of a modified conjugated diene based (co)polymer having a high Mooney viscosity and excellent shape stability; a modified conjugated diene based (co)polymer obtained by such a production method; and a rubber composition.

BACKGROUND ART

In recent years, the demand for the lower fuel consumption of automobiles has become increasingly severe in connection with the social need for energy saving. In order to respond to such a demand, a further reduction in the rolling resistance of tire has been requested. As the method for reducing the rolling resistance of tire, the optimization of tire structure has been studied; however, it is generally conducted to use, as the rubber composition for tire, a material as low as possible in heat build-up.

In order to obtain such a rubber composition low in heat build-up, a number of technical studies have hitherto been made to develop a modified rubber for the rubber composition which contains silica and carbon black as a filler. There was proposed, for example, a method for producing a polymer, which comprises subjecting a conjugated diolefin or a conjugated diolefin and an aromatic vinyl compound to anionic polymerization in a hydrocarbon solvent, using, as an initiator, at lest one compound selected from the groups consisting of organic alkali metals and organic alkaline earth metals, to obtain a polymer and then reacting the terminal of the polymer with a particular amino group-containing alkoxysilane compound (see, for example, Patent Document 1).

Further, in order to produce a modified polymer which has a high interaction with silica and carbon black and can give improved fracture resistance, abrasion resistance and low heat build-up, there was proposed a method which comprised conducting a primary modification reaction of reacting the active site of a polymer having, in the molecule, an active site of an organic metal, with a hydrocarbyloxysilane compound and then conducting a secondary modification reaction of reacting the resulting polymer with a hydrocarbyloxysilane compound (see, for example, Patent Document 2).

Patent Document 1: WO 03/029299 A
Patent Document 2: WO 03/048216 A

DISCLOSURE OF THE INVENTION

However, the conjugated diene based (co)polymers obtained by such conventional methods have had problems of low Mooney viscosity and inferior processability. Further, the conjugated diene based (co)polymers are poor in shape stability (for example, poor in cold flow) and accordingly have had a problem that, with the lapse of time, high-molecular components other than the intended branched structure are formed.

The present invention has been made in view of these problems of the prior art. The present invention provides a method for producing a modified conjugated diene based (co)polymer, which enables production of a modified conjugated diene based (co)polymer having a high Mooney viscosity and excellent shape stability; a modified conjugated diene based (co)polymer obtained by such a production method; and a rubber composition.

According to the present invention, there are provided a method for producing a modified conjugated diene based (co)polymer, a modified conjugated diene based (co)polymer, and a rubber composition, all described below.

[1] A method for producing a modified conjugated diene based (co)polymer, which comprises
a step (a) for obtaining a primarily modified polymer by conducting a primary modification reaction wherein at least one member selected from the group consisting of an alkoxysilane compound and a silanol compound is introduced into the active alkali metal terminal of a conjugated diene based (co)polymer having an active alkali metal terminal, the conjugated diene based (co)polymer being obtained by subjecting at least a diene monomer to anionic polymerization in a hydrocarbon solvent using an alkali metal-based initiator, and
a step (b) for obtaining a secondarily modified polymer (a modified conjugated diene based (co)polymer) by subjecting the above-obtained primarily modified polymer to reactions including the following step (b1) and step (b2).
Step (b1): a reaction with a condensation accelerator containing a metal element.
Step (b2): a reaction with at least one member selected from the group consisting of inorganic acids and metal halides.

[2] The method for producing a modified conjugated diene based (co)polymer, according to [1], wherein the condensation accelerator containing a metal element is a metal compound containing at least one kind of metal selected from the metals included in the groups 2 to 15 of periodic table.

[3] The method for producing a modified conjugated diene based (co)polymer, according to [2], wherein the condensation accelerator containing a metal element is an alkoxide, a carboxylic acid salt, or an acetyl acetonate complex salt, of the metal.

[4] The method for producing a modified conjugated diene based (co)polymer, according to any one of [1] to [3], wherein the metal halide is a metal halide containing at least one kind of metal selected from the metals included in the groups 2 to 15 of periodic table.

[5] The method for producing a modified conjugated diene based (co)polymer, according to any one of [1] to [4], wherein the alkoxysilane compound is a compound including at least one member selected from the group consisting of the compounds represented by the following general formula (I), the compounds represented by the following general formula (II), and partial condensation products of these compounds.

[Formula 1]

(In the general formula (I), $R^1$ and $R^2$ are each independently a mono-valent aliphatic hydrocarbon group having 1 to 20 carbon atoms or a mono-valent aromatic hydrocarbon group having 6 to 18 carbon atoms; a is an integer of 0 to 2; when there are a plurality of $OR^2$s, the plurality of $OR^2$s may be the same or different from each other; and there is no active proton in the molecule.)

[Formula 2]

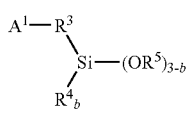

(II)

(In the formula (II), $A^1$ is a mono-valent group having at least one functional group selected from the group consisting of epoxy, isocyanate, imine, carboxylic acid ester, carboxylic acid anhydride, cyclic tertiary amine, acyclic tertiary amine, pyridine, silazane and disulfide; $R^3$ is a single bond or a bi-valent hydrocarbon group; $R^4$ and $R^5$ are each independently a mono-valent aliphatic hydrocarbon group having 1 to 20 carbon atoms or a mono-valent aromatic hydrocarbon group having 6 to 18 carbon atoms; b is an integer of 0 to 2; when there are a plurality of $OR^5$s, the plurality of $OR^5$s may be the same or different from each other; and there is no active proton in the molecule.)

[6] The method for producing a modified conjugated diene based (co)polymer, according to any one of [1] to [5], wherein the conjugated diene based (co)polymer is obtained by subjecting the diene monomer and other monomer including an aromatic vinyl compound to anionic polymerization.

[7] The method for producing a modified conjugated diene based (co)polymer, according to any one of [1] to [6], wherein the conjugated diene based (co)polymer is obtained by subjecting, to anionic polymerization, at least one kind of diene monomer selected from the group consisting of 1,3-butadiene, isoprene and 2,3-dimethyl-1,3-butadiene.

[8] The method for producing a modified conjugated diene based (co)polymer, according to [6] or [7], wherein the aromatic vinyl compound is styrene.

[9] The modified conjugated diene based (co)polymer obtained by a method for producing a modified conjugated diene based (co)polymer, set forth in any one of [1] to [8].

[10] A rubber composition comprising, as a rubber component, a modified conjugated diene based (co)polymer set forth in [9].

[11] The rubber composition according to [10], which further comprises at least either selected from the group consisting of silica and carbon black.

[12] The rubber composition according to [11], which comprises a rubber component containing 20 mass % or more of the modified conjugated diene based (co)polymer and at least either of the group consisting of silica and carbon black and contains the at least either selected from the group consisting of silica and carbon black in an amount of 20 to 120 parts by mass relative to 100 parts by mass of the rubber component.

[13] The rubber composition according to any one of [10] to [12], wherein the rubber component consists of the modified conjugated diene based (co)polymer and other rubber component, and the content of the modified conjugated diene based (co)polymer is 20 to 100 mass % and the content of the other rubber component is 0 to 80 mass % (the modified conjugated diene based (co)polymer+the other rubber component=100 mass %).

[14] The rubber composition according to [13], wherein the other rubber component is at least one kind of rubber component selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

According to the present invention, there can be provided a method for producing a conjugated diene based (co)polymer, which enables production of a modified conjugated diene based (co)polymer having a high Mooney viscosity and excellent shape stability; a conjugated diene based (co)polymer obtained by such a production method; and a rubber composition.

BEST MODE FOR CARRYING OUT THE INVENTION

The best mode for carrying out the present invention is described below. However, the present invention is in no way restricted to the following embodiment. That is, it should be construed that appropriate changes, modifications, etc. can be made to the following embodiment based on the ordinary knowledge possessed by those skilled in the art as long as there is no deviation from the gist of the present invention and that even such changed or modified embodiments are included in the scope of the present invention.

[1] Method for Producing a Modified Conjugated Diene Based (Co)Polymer

The method for producing a modified conjugated diene based (co)polymer, according to the present embodiment is a method for producing a modified conjugated diene based (co)polymer, which comprises a step (a) for obtaining a primarily modified polymer by conducting a primary modification reaction wherein at least one member selected from the group consisting of an alkoxysilane compound and a silanol compound is introduced into the active alkali metal terminal of a conjugated diene based (co)polymer having an active alkali metal terminal, the conjugated diene based (co)polymer being obtained by subjecting at least a diene monomer to anionic polymerization in a hydrocarbon solvent using an alkali metal-based initiator, and a step (b) for obtaining a secondarily modified polymer (a modified conjugated diene based (co)polymer) by subjecting the above-obtained primarily modified polymer to reactions including the following step (b1) and step (b2).

Step (b1): a reaction with a condensation accelerator containing a metal element.

Step (b2): a reaction with at least one member selected from the group consisting of inorganic acids and metal halides.

Thus, the method for producing a modified conjugated diene based (co)polymer, according to the present embodiment is a method for producing a modified conjugated diene based (co)polymer (a secondarily modified polymer) by three-step reactions [a step (a), a step (b1) and a step (b2)]. By the method for producing a modified conjugated diene based (co)polymer, according to the present embodiment, there can be easily obtained a modified conjugated diene based (co) polymer having a high Mooney viscosity and excellent shape stability. Further, the thus-obtained modified conjugated diene based (co)polymer makes easy the vulcanization treatment conducted in obtaining a rubber composition and can provide a rubber composition excellent in tensile strength, rolling resistance, wet skid resistance and abrasion resistance.

The individual steps of the method for producing a modified conjugated diene based (co)polymer, of the present invention are described below more specifically.

[1-1] Step (a) (Formation of Primarily Modified Polymer)

The step (a) in the method for producing a modified conjugated diene based (co)polymer, of the present embodiment is a step for obtaining a primarily modified polymer by conducting a primary modification reaction wherein at least one member selected from the group consisting of an alkoxysilane compound and a silanol compound is introduced into the active alkali metal terminal of a conjugated diene based (co)polymer having an active alkali metal terminal, the conjugated diene based (co)polymer being obtained by subjecting at least a diene monomer to anionic polymerization in a hydrocarbon solvent using an alkali metal-based initiator.

[1-1A] Conjugated Diene Based (Co)Polymer

As the conjugated diene based (co)polymer used in the method for producing a modified conjugated diene based (co)polymer, of the present embodiment, there can be mentioned a homopolymer of a diene monomer and a copolymer of a diene monomer and other monomer (e.g. an aromatic vinyl compound), both the polymer and the copolymer having an active alkali metal terminal. Such a conjugated diene based (co)polymer is excellent in hysteresis loss property, abrasion resistance and fracture resistance.

As to the method for producing a conjugated diene based (co)polymer, there is no particular restriction except that, as mentioned previously, anionic polymerization is conducted using an alkali metal-based initiator (hereinafter, this may be referred to as "polymerization initiator"). For example, the polymerization method used may be any of solution polymerization, gas phase polymerization and bulk polymerization, and solution polymerization is preferred particularly. The polymerization mode may be any of batch mode and continuous mode. The metal of the active site (active alkali metal terminal) present in the molecule of the conjugated diene based (co)polymer is a metal belonging to alkali metals, and lithium metal is preferred particularly.

In the above solution polymerization, an intended conjugated diene based (co)polymer can be obtained, for example, by subjecting a diene monomer or a diene monomer and other monomer (e.g. an aromatic vinyl compound) to anionic polymerization using a lithium compound as a polymerization initiator. It is also effective to allow a halogen-containing monomer to be present together and activate the halogen atom in the polymer obtained, with an alkali metal-based initiator. For example, it is effective to subject the bromine moiety of a copolymer containing an isobutylene unit, a paramethylstyrene unit and a parabromomethylstyrene unit, to lithiation to make the moiety an active site.

As the diene monomer, there can be preferably used, for example, 1,3-butadiene, isoprene, 2,3-dimethyl-butadiene, 1,3-pentadiene, 2,3-dimethylbutadiene, 2-phenyl-1,3-butadiene and 1,3-hexadiene. They may be used singly or in combination of two or more kinds. Of these compounds, 1,3-butadiene, isoprene, 2,3-dimethyl-1,3-butadiene, etc. can be used particularly preferably.

As the aromatic vinyl compound used as the other monomer, there can be preferably used, for example, styrene, α-methylstyrene, 1-vinylnaphthalene, 3-vinyltoluene, ethylvinylbenzene, divinylbenzene, 4-cyclohexylstyrene and 2,4,6-trimethylstyrene. They may be used singly or in combination of two or more kinds. Of these compounds, styrene is preferred particularly.

When the diene monomer and the aromatic vinyl compound are used to conduct copolymerization, 1,3-butadiene and styrene are used preferably. These monomers are advantageous in that they are easy to obtain and have living anion polymerization characteristics. When solution polymerization is used, the monomer concentration in solvent is preferably 5 to 50 mass %, more preferably 10 to 30 mass %. Incidentally, when the diene monomer and the aromatic vinyl compound are used to conduct copolymerization, the content of the aromatic vinyl compound in the monomer mixture fed is preferably 3 to 50 mass %, more preferably 6 to 45 mass %.

As to the lithium compound used as the alkali metal-based initiator, there is no particular restriction. However, an organic lithium compound and a lithium amide compound can be mentioned as preferred examples. When the former organic lithium compound is used, there can be obtained a conjugated diene based (co)polymer having a hydrocarbon group at the polymerization initiation terminal and a polymerization active site at the other terminal. When the latter lithium amide compound is used, there can be obtained a conjugated diene based (co)polymer having a nitrogen-containing group at the polymerization initiation terminal and a polymerization active site at the other terminal.

As the organic lithium compound, there are preferred those having a hydrocarbon group having 1 to 20 carbon atoms. There can be mentioned, for example, methyl lithium, ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, and a reaction product between diisopropenylbenzene and butyl lithium. Of these compounds, n-butyl lithium and sec-butyl lithium are preferred.

As the lithium amide compound, there can be mentioned, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperadide, lithium ethylpropylamide, lithium ethylbutylamide, lithium ethylbenzylamide and lithium methylphenetylamide. Of these compounds, preferred are cyclic lithium amide such as lithium hexamethyleneimide, lithium pyrrolidide, lithium piperidide, lithium heptamethyleneimide and lithium dodecamethyleneimide from the standpoints of the interaction with carbon black and the polymerization initiation ability; and particularly preferred are lithium hexamethyleneimide, lithium pyrrolidide and lithium piperidide.

The lithium amide compound is, in general, prepared beforehand from a secondary amine and a lithium compound and then used in polymerization; however, it may be prepared in polymerization system (in-situ). The use amount of the polymerization initiator is preferably 0.2 to 20 mmol per 100 g of monomer.

As the method for specifically producing the conjugated diene based (co)polymer by anionic polymerization using the lithium compound as a polymerization initiator, there can be mentioned, for example, a method of subjecting a diene monomer or a diene monomer and an aromatic vinyl compound to anionic polymerization in an organic solvent inert to the reaction [e.g. a hydrocarbon solvent (an aliphatic, alicyclic or aromatic solvent)], using the above-mentioned lithium compound as a polymerization initiator, in the presence of a randomizer used as necessary. By such a method, an intended conjugated diene based (co)polymer can be obtained.

As the hydrocarbon solvent, there are preferred those having 3 to 8 carbon atoms. There can be mentioned, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene and ethylbenzene. They may be used singly or in admixture of two or more kinds.

The randomizer used as necessary refers to a compound which can control the microstructure of conjugated diene based (co)polymer, for example, can increase the 1,2-bond of butadiene moiety of butadiene-styrene copolymer or the 3,4-bond of isoprene polymer, or can control the monomer unit distribution in conjugated diene based (co)polymer, for example, can randomize the butadiene unit and styrene unit in butadiene-styrene copolymer. There is no particular restriction as to the randomizer, and any of known randomizers used generally can be selected appropriately. Specifically, there can be mentioned, for example, ethers and tertiary amines, such as dimethoxybenzene, tetrahydrofuran, dimethoxyethane, diethylene glycol dibutyl ether, diethylene glycol dimethyl ether, bistetrahydrofurylpropane, triethylamine, pyridine, N-methylmorpholine, N,N,N',N'-tetramethylethylenediamine and 1,2-dipiperidinoethane. These randomizers may be used singly or in combination of two or more kinds.

A potassium compound may be added together with the polymerization initiator when it is intended to increase the reactivity of the polymerization initiator or when it is intended to arrange the aromatic vinyl compound at random in the polymer obtained or to allow the obtained polymer to contain the aromatic vinyl compound as a single chain. As the potassium compound added together with the polymerization initiator, there can be used, for example, potassium alkoxides and potassium phenoxides, typified by potassium isopropoxide, potassium tert-butoxide, potassium tert-amyloxide, potassium n-heptaoxide, potassium benzyloxide and potassium phenoxide; potassium salts of isovaleric acid, caprylic acid, lauric acid, palmitic acid, stearic acid, oleic acid, linoleic acid, benzoic acid, phthalic acid, 2-ethylhexanoic acid, etc.; potassium salts of organic sulfonic acids such as dodecylbenzensulfonic acid, tetradecylbenzenesulfonic acid, hexadecylbenzenesulfonic acid, octadecylbenzenesulfonic acid and the like; potassium salts of organic phosphorous acid partial esters such as diethyl phosphite, diisopropyl phosphite, diphenyl phosphite, dibutyl phosphite, dilauryl phosphite and the like.

The potassium compound is preferably added in an amount of 0.005 to 0.5 mol per g atom equivalent of the alkali metal of the polymerization initiator. When the amount is less than 0.005 mol, the addition effect of the potassium compound (the increase in the reactivity of polymerization initiator and the randomization or single chain addition of aromatic vinyl compound) may not appear. Meanwhile, when the amount is more than 0.5 mol, there may be a reduction in polymerization activity and a striking reduction in productivity and, moreover, there may be a reduction in the modification efficiency in primary modification reaction.

The temperature in the polymerization reaction is preferably −20 to 150° C., more preferably 0 to 120° C. The polymerization reaction can be conducted under the pressure which appears in the reaction, but is preferably conducted ordinarily at a pressure which is sufficient to keep the monomer substantially in a liquid phase. That is, the polymerization pressure used differs depending upon the individual substances to be polymerized, the polymerization medium used, and the polymerization temperature employed; however, a higher pressure may be used if necessary and such a pressure can be obtained by an appropriate means such as pressurization of reactor using a gas inert to the polymerization reaction.

In the polymerization, each of the raw materials associated therewith, such as polymerization initiator, solvent, monomer(s) and the like is preferably used in the form in which reaction-hindering substances such as water, oxygen, carbon dioxide, protic compound and the like have been removed. Incidentally, when the polymer is obtained as an elastomer, the polymer or copolymer obtained, preferably has a glass transition temperature (Tg) of −90 to 0° C. as determined by differential thermal analysis. It is difficult to obtain a polymer having a glass transition temperature of less than −90° C. When the glass transition temperature is higher than 0° C., the viscosity is too high at around room temperature, which may make the handling difficult.

[1-1B] Alkoxysilane Compound

In the primary modification reaction in the step (a), at least one member selected from an alkoxysilane compound and a silanol compound is used as an agent for primary modification. As to the kind of the alkoxysilane compound used as an agent for primary modification, there is no particular restriction. However, it is preferred to use a compound including at least one member selected from the group consisting of the compounds represented by the following general formula (I), the compounds represented by the following general formula (II), and partial condensation products of these compounds.

[Formula 3]

(I)

In the general formula (I), $R^1$ and $R^2$ are each independently a mono-valent aliphatic hydrocarbon group having 1 to 20 carbon atoms or a mono-valent aromatic hydrocarbon group having 6 to 18 carbon atoms; a is an integer of 0 to 2; when there are a plurality of $OR^2$s, the plurality of $OR^2$s may be the same or different from each other; and there is no active proton in the molecule.

[Formula 4]

(II)

In the formula (II), $A^1$ is a mono-valent group having at least one functional group selected from the group consisting of epoxy, isocyanate, imine, carboxylic acid ester, carboxylic acid anhydride, cyclic tertiary amine, acyclic tertiary amine, pyridine, silazane and disulfide; $R^3$ is a single bond or a bi-valent hydrocarbon group; $R^4$ and $R^5$ are each independently a mono-valent aliphatic hydrocarbon group having 1 to 20 carbon atoms or a mono-valent aromatic hydrocarbon group having 6 to 18 carbon atoms; b is an integer of 0 to 2; when there are a plurality of $OR^5$s, the plurality of $OR^5$s may be the same or different from each other; and there is no active proton in the molecule.

Here, the partial condensation products refer to compounds formed by changing part (not all) of the SiOR groups of alkoxysilane compound into SiOSi bond by condensation. In the primary modification reaction, it is preferred that at least 20% of the polymer chains of the polymer used has living characteristics.

As specific examples of the alkoxysilane compound represented by the general formula (I), used in the reaction with the active site of the polymer, there can be mentioned, for example, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimetridimethoxysilane, methylphenyldimethoxysilane, dimethyldietoxysilane, vinyltrimethoxysilane, vinyltriethoxysilane and divinyldiethoxysilane. Of these, preferred are tetraethoxysilane, methyltriethoxysilane and dimethyldiethoxysilane. They may be used singly or in combination of two or more kinds.

As specific examples of the alkoxysilane compounds represented by the general formula (II), used for the reaction with the active site of the polymer, there can be mentioned epoxy group-containing alkoxysilane compounds, for example, 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane. Of these, 3-glycidoxypropyltrimethoxysilane and 2-[3,4-epoxycyclohexyl]ethyltrimethoxysilane can be used preferably.

As the isocyanate group-containing alkoxysilane compound, there can be mentioned 3-isocyanatepropyltrimethoxysilane, 3-isocyanatepropyltriethoxysilane, 3-isocyanatepropylmethyldiethoxysilane, 3-isocyanatepropyltriisopropoxysilane, etc. Of these, 3-isocyanatepropyltrimethoxysilane can be used preferably.

As the imine group-containing alkoxysilane compound, there can be mentioned N-(1,3-dimethylbutylidene)-3-(triethoxysilyl)-1-propaneamine; N-(1,3-methyletylidene)-3-(triethoxysilyl)-1-propaneamine; N-ethylidene-3-(triethoxysilyl)-1-propaneamine; N-(1-methylpropylidene)-3-(triethoxysilyl)-1-propaneamine; N-(4-N,N-dimethylaminobenzylidene)-3-(triethoxysilyl)-1-propaneamine; N-(cyclohexylidene)-3-(triethoxysilyl)-1-propaneamine; trimethoxysilyl compound, methyldiethoxysilyl compound or ethyldimethoxysilyl compound corresponding to any of the above triethoxysilyl compounds; etc. Of these, preferably used are N-(1,3-dimethylbutylidene)-3-(triethoxysilyl)-1-propaneamine and N-(1-methylpropylidene)-3-(triethoxysilyl)-1-propaneamine.

As the imine(amidine) group-containing compound, there can be mentioned 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, 3-(1-hexamethyleneimino)propyl(triethoxy)silane, (1-hexamethyleneimino)methyl(trimethoxy)silane, N-(3-triethoxysilylpropyl)-4,5-dihydroimidazole, N-(3-isopropoxysilylpropyl)-4,5-dihydroimidazole, N-(3-methyldiethoxysilylpropyl)-4,5-dihydroimidazole, etc. Of these, preferably used are N-(3-triethoxysilylpropyl)-4,5-dihydroimidazole and N-(3-isopropoxysilylpropyl)-4,5-dihydroimidazole.

As the carboxylic acid ester-containing alkoxysilane compound, there can be mentioned, for example, 3-methacryloyloxypropyltriethoxysilane, 3-methacryloyloxypropyltrimethoxysilane, 3-methacryloyloxypropylmethyldiethoxysilane and 3-methacryloyloxypropyltriisopropoxysilane. Of these, 3-methacryloyloxypropyltriethoxysilane can be used preferably.

As the carboxylic acid anhydride-containing alkoxysilane compound, there can be mentioned, for example, 3-trimethoxysilylpropylsuccinic acid anhydride, 3-triethoxysilylpropylsuccinic acid anhydride and 3-methyldiethoxysilylpropylsuccinic acid anhydride. Of these, 3-triethoxysilylpropylsuccinic acid anhydride can be used preferably.

As the cyano group-containing alkoxysilane compound, for example, 2-cyanoethylpropyltriethoxysilane can be mentioned.

As the cyclic tertiary amine-containing alkoxysilane compound, there can be mentioned, for example, 3-(1-hexamethyleneimino)propyltriethoxysilane, 3-(1-hexamethyleneimino)propyltrimethoxysilane, (1-hexamethyleneimino)methyltriethoxysilane, (1-hexamethyleneimino)methyltrimethoxysilane, 2-(1-hexamethyleneimino)ethyltriethoxysilane, 3-(1-hexamethyleneimino)ethyltrimethoxysilane, 3-(1-pyrrolidinyl)propyltrimethoxysilane, 3-(1-pyrrolidinyl)propyltriethoxysilane, 3-(1-heptamethyleneimino)propyltriethoxysilane, 3-(1-dodecamethyleneimino)propyltriethoxysilane, 3-(1-hexamethyleneimino)propyldiethoxymethylsilane, 3-(1-hexamethyleneimino)propyldiethoxyethylsilane, and 3-[10-(triethoxysilyl)decyl]-4-oxazoline. Of these, 3-(1-hexamethyleneimino)propyltriethoxysilane and (1-hexamethyleneimino)methyltriethoxysilane can be used preferably.

As the acyclic tertiary amine-containing alkoxysilane compound, there can be mentioned, for example, 3-dimethylaminopropyltriethoxysilane, 3-dimethylaminopropyltrimethoxysilane, 3-diethylaminopropyltriethoxysilane, 3-dimethylaminopropyltrimethoxysilane, 2-dimethylaminoethyltriethoxysilane, 2-dimethylaminoethyltrimethoxysilane, 3-dimethylaminopropyldiethoxymethylsilane, and 3-dibutylaminopropyltriethoxysilane. Of these, 3-dimethylaminopropyltriethoxysilane and 3-diethylaminopropyltriethoxysilane can be used preferably.

As the pyridine-containing alkoxysilane compound, for example, 2-trimethoxysilylethylpyridine can be mentioned.

As the silazane-containing alkoxysilane compound, there can be mentioned, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, and N,N-bis(trimethylsilyl)aminoethylmethyldiethoxysilane. Of these, preferably used are N,N-bis(trimethylsilyl)aminopropyltriethoxysilane, N,N-bis(trimethylsilyl)aminopropylmethyldiethoxysilane, and 1-trimethylsilyl-2,2-dimethoxy-1-aza-2-silacyclopentane.

As the sulfide-containing alkoxysilane compound, there can be mentioned, for example, bis(3-triethoxysilylpropyl)tetrasulfide and bis(3-triethoxysilylpropyl)disulfide.

These alkoxysilane compounds may be used singly or in combination of two or more kinds. The partial condensation products of the alkoxysilane compounds may be used as well. Incidentally, in the step (a), there may be used, as the alkoxysilane compound to be reacted with the active site of the conjugated diene based (co)polymer, any mixture of the alkoxysilane compounds represented by the general formula (I) or (II).

[1-1C] Silanol Compound

As to the kind of the silanol compound used as an agent for primary modification in the primary modification reaction, there is no particular restriction. However, there can be mentioned, for example, octaphenylcyclotetrasiloxane, tetraphenyl(tetramethyl)cyclotetrasiloxane, and decamethylcyclopentasiloxane.

These silanol compounds may be used singly or in combination of two or more kinds. Incidentally, as the agent for primary modification, the above-mentioned alkoxysilane and the silanol compound may be used in combination or either one of them may be used.

[1-1D] Primary Modification Reaction

The primary modification reaction, in which the agent for primary modification (at least one member selected from the group consisting of the alkoxysilane compound and the silanol compound) is introduced into the active alkali metal terminal of the conjugated diene based (co)polymer, can be conducted by, for example, solution reaction (the solution used may contain an unreacted monomer used in production of conjugated diene based (co)polymer). As the mode of the primary modification reaction, there is no particular restriction, and it may be a mode using a batch type reactor or may be a continuous mode using a multi-stage continuous reactor or an in-line mixer and the like. The primary modification reaction is preferably conducted after the production of conjugated diene based (co)polymer but before various operations required for polymer isolation, such as solvent removal, water treatment, thermal treatment and the like.

In the primary modification reaction, the at least one member selected from an alkoxysilane compound and a silanol compound is added preferably by 0.1 mol equivalent or more, more preferably by 0.3 mol equivalent or more, relative to the active site of the conjugated diene based (co)polymer obtained by anionic polymerization. When the addition amount is less than 0.1 mol equivalent, the primary modification reaction does not proceed sufficiently, the dispersibility of the filler is not improved sufficiently, and the mechanical properties, abrasion resistance and low heat build-up after vulcanization may be inferior.

As to the addition method of the agent for primary modification, there is no particular restriction. There can be mentioned an addition method in one portion, an addition method in portions, a continuous addition method, etc.; however, an addition method in one portion is preferred.

As the temperature of the primary modification reaction, the polymerization temperature used in production of conjugated diene based (co)polymer may be used as it is. As a preferred temperature range, 0 to 120° C. is mentioned specifically. 20 to 100° C. is more preferred. As the temperature is lower, the viscosity of polymer may increase; as the temperature is higher, the active terminal of polymer tends to be deactivated; therefore, such a higher or lower temperature is not preferred. The reaction time of the primary modification reaction is preferably 1 minute to 5 hours, more preferably 2 minutes to 1 hour.

[1-2] Step (b) [Formation of Secondarily Modified Polymer (Modified Conjugated Diene Based (Co)Polymer)]

The step (b) in the method for producing a modified conjugated diene based (co)polymer, of the present embodiment is a step for obtaining a secondarily modified polymer (a modified conjugated diene based (co)polymer) by subjecting the primarily modified polymer obtained by the primary modification reaction, to the step (b1) and the step (b2) both mentioned above, in any desired order. The step (b1) is a step for reacting the primarily modified polymer (when the step (b2) is conducted first, the polymer obtained in the step (b2)) with a condensation accelerator containing a metal element; and the step (b2) is a step for reacting the primarily modified polymer (when the step (b1) is conducted first, the polymer obtained in the step (b1)) with at least one member selected from the group consisting of inorganic acids and metal halides.

[1-2A] Step (b1)

As mentioned above, the step (b1) is a step for reacting the primarily modified polymer or the polymer obtained in the step (b2) with a condensation accelerator containing a metal element. In the step (b1), the alkyl group constituting the alkoxysilane compound introduced into the primarily modified polymer or the silanol group constituting the silanol compound introduced into the primarily modified polymer is replaced with the metal element contained in the condensation accelerator, whereby a polymer is formed.

The thus-obtained polymer is very high in reactivity; therefore, when the step (b1) is conducted first, a high reaction efficiency can be obtained in the subsequent step (b2).

As to the reaction in the step (b1), there is no particular restriction. The reaction can be conducted by, for example, solution reaction (the solution used may contain an unreacted monomer used in production of conjugated diene based (co) polymer). As to the mode of the reaction in the step (b1), there is no particular restriction, and it may be a mode using a batch type reactor or may be a continuous mode using a multi-stage continuous reactor or an in-line mixer. This modification reaction is preferably conducted after the production of primarily modified polymer but before various operations required for polymer isolation, such as solvent removal, water treatment, thermal treatment and the like.

In the step (b1), as the condensation accelerator containing a metal element (hereinafter, this may be referred to simply as "condensation accelerator"), there is preferably used a metal compound containing at least one kind of metal selected from the metals included in the groups 2 to 15 of periodic table. Preferred specific examples of the metal element are titanium, zirconium, aluminum, bismuth and tin.

Preferred as the condensation accelerator containing such a metal element are alkoxides, carboxylic acid salts and acetylacetonate complex slats, of the above-mentioned metals.

As the condensation accelerator, there can be specifically mentioned tetramethoxy titanium, tetraethoxy titanium, tetra-n-propoxy titanium, tetraisopropoxy titanium, tetra-n-butoxy titanium, tetra-n-butoxy titanium oligomer, tetra-sec-butoxy titanium, tetra-tert-butoxy titanium, tetra(2-ethylhexyloxy) titanium, bis(octanedioleate)bis(2-ethylhexyloxy) titanium, tetra(octanedioleate) titanium, titanium lactate, titanium dipropoxy bis(triethanolaminate), titanium dibutoxy bis(triethanolaminate), titanium tributoxystearate, titanium tripropoxy stearate, titanium tripropoxy acetylacetonate, titanium dipropoxy bis(acetylacetonate), titanium tripropoxy ethylacetoacetate, titanium propoxy acetylacetonate bis (ethylacetoacetate), titanium tributoxy acetylacetonate, titanium dibutoxy bis(acetylacetonate), titanium tributoxy ethylacetoacetate, titanium butoxy acetylacetonate bis (ethylacetoacetate), titanium tetrakis(acetylacetonate), and titanium diacetylacetonate bis(ethylacetoacetate).

There can also be mentioned bis(2-ethylhexanoate) titanium oxide, bis(laurate) titanium oxide, bis(naphthate) titanium oxide, bis(stearate) titanium oxide, bis(oleate) titanium oxide, bis(linolate) titanium oxide, tetrakis(2-ethylhexanoate) titanium, tetrakis(laurate) titanium, tetrakis(naphthate) titanium, tetrakis(stearate) titanium, tetrakis(oleate) titanium, tetrakis(linolate) titanium, tris(2-ethylhexanoate) bismuth, tris(laurate) bismuth, tris(naphthate)bismuth, tris (stearate)bismuth, tris(oleate)bismuth and tris(linolate)bismuth.

There can also be mentioned tetraethoxy zirconium, tetra-n-propoxy zirconium, tetraisopropoxy zirconium, tetra-n-butoxy zirconium, tetra-sec-butoxy zirconium, tetra-tert-butoxy zirconium, tetra(2-ethylhexyl) zirconium, zirconium tributoxy stearate, zirconium tributoxy acetylacetonate, zirconium dibutoxy bis(acetylacetonate), zirconium tributoxy ethylacetoacetate, zirconium butoxy acetylacetonate bis(ethylacetoacetate), zirconium tetrakis(acetylacetonate), zirconium diacetylacetonate bis(ethylacetoacetate), bis(2-ethylhexanoate) zirconium oxide, bis(laurate) zirconium oxide, bis(naphthate) zirconium oxide, bis(stearate) zirconium oxide, bis(oleate) zirconium oxide, bis(linolate) zirconium oxide, tetrakis(2-ethylhexanoate) zirconium, tetrakis(laurate) zirconium, tetrakis(naphthate) zirconium, tetrakis(stearate) zirconium tetrakis(oleate) zirconium and tetrakis(linolate) zirconium.

There can further be mentioned triethoxy aluminum, tri-n-propoxy aluminum, tri-isopropoxy aluminum, tri-n-butoxy aluminum, tri-sec-butoxy aluminum, tri-tert-butoxy aluminum, tri(2-ethylhexyl) aluminum, aluminum dibutoxy stearate, aluminum dibutoxy acetylacetonate, aluminum butoxy bis(acetylacetonate), aluminum dibutoxy ethylacetoacetate, aluminum tris(acetylacetonate), aluminum tris(ethylacetoacetate), tris(2-ethylhexanoate) aluminum, tris(laurate) aluminum, tris(naphthate) aluminum, tris(stearate) aluminum, tris(oleate) aluminum, tris(linolate) aluminum, bis(n-octanoate) tin, bis(2-ethylhexanoate) tin, dilaurate tin, dinaphthenate tin, distearate tin, dioleate tin, dibutyl tin diacetate, dibutyl tin bis(n-octanoate), dibutyl tine bis(2-ethylhexanoate), dibutyl tin dilaurate, dibutyl tin maleate, dibutyl tin bis(benzylmaleate), dibutyl tin bis(2-ethylhexylmaleate), di-n-octyl tin diacetate, di-n-octyl tin bis(n-octanoate), di-n-octyl tin bis(2-ethylhexanoate), di-n-octyl tin dilaurate, di-n-octyl tin maleate, di-n-octyl tin bis(benzylmaleate), di-n-octyl tin bis(2-ethylhexylmaleate), etc.

Of these condensation accelerators, preferred are tetrakis(2-ethylhexyloxy) titanium, tetra(octanedioleate) titanium, tris(2-ethylhexanoate)bismuth, tetra-n-propoxy zirconium, tetra-n-butoxy zirconium, bis(2-ethylhexanoate) zirconium oxide, bis(oleate) zirconium oxide, triisopropoxy aluminum, tri-sec-butoxy aluminum, tris(2-ethylhexanoate) aluminum, tris(stearate) aluminum, zirconium tetrakis(acetylacetonate), aluminum tris(acetylacetonate), bis(2-ethylhexanoate) tin and di-n-octyl tin bis(2-ethylhexylmaleate).

As to the use amount of the condensation accelerator containing a metal element, for example, the mols of the metal compound constituting the condensation accelerator are preferably 0.1 to 10, more preferably 0.5 to 5 in terms of the mol ratio relative to the total amount of the alkoxysilyl group present in the reaction system. When the mol ratio is less than 0.1, the secondary modification reaction does not proceed sufficiently. Meanwhile, a mol ratio of more than 10 is not preferred economically because the effect of the condensation accelerator reacting with the alkoxysilyl group introduced into the primarily modified polymer is saturated.

The temperature when the condensation accelerator is reacted, is preferably 20 to 180° C., more preferably 30 to 160° C., particularly preferably 50 to 150° C. When the reaction temperature is lower than 20° C., the progress of the reaction of condensation accelerator is slow and the reaction may not be completed; as a result, the polymer obtained in the step (b1) may cause quality change with the lapse of time, which may become a problem. Meanwhile, when the reaction temperature is higher than 180° C., the aging of the polymer obtained proceeds, which may deteriorate the properties of the polymer obtained. Therefore, such temperatures are not preferred.

The time when the condensation accelerator is reacted, is preferably 0.5 minute to 10 hours, more preferably about 1 minute to 5 hours. When the reaction time is shorter than 0.5 minute, the reaction is not completed. Meanwhile, with a reaction time of longer than 10 hours, the reaction is saturated. Therefore, such reaction times are not preferred.

The pressure of the reaction system when the condensation accelerator is reacted, is preferably 0.01 to 20 MPa, more preferably 0.05 to 10 MPa. As to the mode of the reaction, there is no particular restriction. The reaction may be conducted using a batch type reactor, or may be conducted continuously using an apparatus such as multi-stage continuous reactor.

[1-2B] Step (b2)

The step (b2) conducted in the method for producing a modified conjugated diene based (co)polymer, of the present embodiment is a step for reacting the primarily modified polymer or the polymer obtained in the step (b1), with at least one member selected from the group consisting of inorganic acids and metal halides.

In the present embodiment, there is described below a case of conducting the step (b2) for the polymer obtained in the step (b1), to obtain a secondarily modified polymer (a modified conjugated diene based (co)polymer). However, as described previously, even by conducting the step (b2) prior to the step (b1) and then subjecting the obtained polymer to the step (b1), the same secondarily modified polymer (modified conjugate diene polymer) can be obtained satisfactorily.

In the method for producing a modified conjugated diene based (co)polymer, of the present embodiment, there are conducted, after the step (B1) and the step (b2), solvent removal (e.g. steam stripping) and drying, both known in the production of conjugated diene based (co)polymer, whereby a secondarily modified polymer (a modified conjugated diene based (co)polymer) can be recovered.

By conducting the step (b2), there can be obtained a modified conjugated diene based (co)polymer having a high Mooney viscosity and excellent shape stability. With the thus-obtained modified conjugated diene based (co)polymer, the vulcanization conducted when a rubber composition is obtained therefrom, is easy and a rubber composition can be obtained which is excellent in tensile strength, rolling resistance, wet skid resistance and abrasion resistance.

As to the inorganic acids used in the step (b2), there is no particular restriction. For example, hydrochloric acid, sulfuric acid and phosphoric acid can be mentioned as preferred examples.

As the metal halides, there can be preferably used a metal halide containing at least one kind of metal selected from the metals included in the groups 2 to 15 of periodic table. Although not restricted particularly, more preferred is a metal halide containing at least one metal atom selected from the group consisting of silicon (Si), tin (Sn), aluminum (Al), zinc (Zn), titanium (Ti) and zirconium (Zr). Specifically there can be mentioned at least one kind of compound selected from the group consisting of, for example, trimethylsilyl chloride, dimethyldichlorosilane, methyltrichlorosilane, silicon tetrachloride, methyldichlorosilane, tin tetrachloride, diethyl aluminum chloride, ethyl aluminum sesquichloride, ethyl aluminum dichloride, zinc chloride, titanium tetrachloride, titanocene dichloride, zirconium tetrachloride and zirconocene dichloride.

The reaction in the step (b2) is conducted preferably in the presence of water. The water may be used in the form of water per se, an alcohol or other solution, a micelle dispersed in hydrocarbon solvent, etc. The polymer obtained in the step (b1) or a solution thereof may be contacted directly with water. Or, the contact with water may be, for example, the steam stripping conducted when the secondarily modified polymer (modified conjugated diene based (co)polymer) is recovered. Or, the latent water contained in the compound capable of releasing water in the reaction system, such as the water adsorbed on solid, the water of hydrate, or the like can also be used effectively. Therefore, it is possible to use a compound capable of releasing water easily (for example, a solid having water adsorbed thereon or a hydrate), together with at least one member selected from the group consisting of inorganic acids and metal halides.

In the step (b2), for example, the polymer obtained in the step (b1) is reacted with at least one member selected from the group consisting of inorganic acids and metal halides, to obtain a polymer in which at least one polymer chain of the conjugated diene based (co)polymer (which is a base polymer) is bonded. In the method for producing a modified conjugated diene based (co)polymer, of the present embodiment, there can be obtained a secondarily modified polymer (a modified conjugated diene based (co)polymer) having a branched structure, in which a plurality of polymer chains of the conjugated diene based (co)polymer are bonded.

In the step (b2), there is no particular restriction as to the method for reacting the polymer obtained in the step (b1) with at least one member selected from the group consisting of inorganic acids and metal halides. The reaction can be conducted, for example, by adding, into the polymer solution obtained in the step (b1), the at least one member per se or a solution thereof, followed by mixing, or by dissolving the at least one member in water and then contacting the solution with the polymer.

The reaction temperature in the step (b2) is preferably 20 to 180° C., more preferably 40 to 160° C., particularly preferably 50 to 140° C. When the reaction temperature is lower than 20° C., the progress of the reaction is slow and the reaction may not be completed; as a result, the polymer obtained may cause quality change with the lapse of time, which may become a problem. Meanwhile, when the reaction temperature is higher than 180° C., the aging of the polymer obtained proceeds, which may deteriorate the properties of the polymer obtained.

The reaction time in the step (b2) is preferably 0.5 minute to 10 hours, more preferably about 1 minute to 5 hours. When the reaction time is shorter than 0.5 minute, the modification reaction is not completed. Meanwhile, with a reaction time of longer than 10 hours, the modification reaction is saturated. Therefore, such reaction times are not preferred.

The pressure of the reaction system in the step (b2) is preferably 0.01 to 20 MPa, more preferably 0.05 to 10 MPa. As to the mode of the reaction, there is no particular restriction. The reaction may be conducted using a batch type reactor, or may be conducted continuously using an apparatus such as multi-stage continuous reactor.

By conducting the step (b1) and the step (b2), both described above, for the primarily modified polymer in any desired order, there can be produced a modified conjugated diene based (co)polymer having a high Mooney viscosity and excellent shape stability.

[2] Modified Conjugated Diene Based (Co)Polymer

Next, an embodiment of the modified conjugated diene based (co)polymer of the present invention is described specifically. The modified conjugated diene based (co)polymer of the present embodiment is a modified conjugated diene based (co)polymer (secondarily modified polymer) obtained by the above-described method for producing a modified conjugated diene based (co)polymer. The modified conjugated diene based (co)polymer is a polymer in which at least one polymer chain of the primarily modified polymer obtained by the primary modification reaction, and has a high Mooney viscosity and excellent shape stability. The modified conjugated diene based (co)polymer of the present embodiment is preferably a polymer having a branched structure, in which a plurality of polymer chains are bonded.

The Mooney viscosity (ML1+4, 100° C.) of the modified conjugated diene based (co)polymer of the present embodiment is 20 to 150, more preferably 40 to 120. When the Mooney viscosity (ML1+4, 100° C.) is less than 20, the rubber properties including fracture resistance, of the polymer tend to be inferior. Meanwhile, when the Mooney viscosity (ML1+4, 100° C.) is more than 150, the handleability of the polymer is inferior, which may make difficult the kneading of the polymer with compounding agents.

The ratio (Mw/Mn) of weight-average molecular weight (Mw) and number-average molecular weight (Mn), of the modified conjugated diene based (co)polymer as measured by gel permeation chromatography is preferably 4.0 or less, more preferably 3.5 or less, particularly preferably 3.0 or less.

[3] Rubber Composition

An embodiment of the rubber composition of the present invention contains the above-mentioned modified conjugated diene based (co)polymer as the rubber component. The detail thereof is described below.

[3-1] Rubber Component

The rubber component contained in the rubber composition of the present embodiment contains the above-mentioned modified conjugated diene based (co)polymer. The content of the modified conjugated diene based (co)polymer in the rubber component is preferably 20 mass % or more, more preferably 25 mass % or more, particularly preferably 30 mass % or more. When the content of the modified conjugated diene based (co)polymer in the rubber component is less than 20 mass %, the rubber composition tends to be insufficient in mechanical properties (e.g. tensile strength and tensile elongation), crack propagation and abrasion resistance.

The rubber component may contain one kind or two or more kinds of the modified conjugated diene based (co)polymer. The rubber component may contain other rubber component, besides the modified conjugated diene based (co) polymer. As the other rubber component, there can be mentioned natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber, halogenated butyl rubber, mixtures thereof, etc.

[3-2] Other Component (Carbon Black and Silica)

Preferably, the rubber composition of the present embodiment further contains at least either selected from the group consisting of carbon black and silica. As specific examples of the carbon black, there can be mentioned various grads of carbon blacks such as SRF, GPF, FEF, HAF, ISAF, SAF and the like. A carbon black having an iodine adsorption amount (IA) of 60 mg/g or more and a dibutyl phthalate absorption amount (DBP) of 80 ml/100 g or more is preferred. Use of carbon black results in large improvements in the grip property and fracture resistance of rubber composition. HAF, ISAF and SAF all superior in abrasion resistance are preferred particularly. Carbon black can be used in one kind or in combination of two or more kinds.

As specific examples of silica, there can be mentioned wet silica (hydrous silicic acid), dry silica (anhydrous silicic acid), calcium silicate and aluminum silicate. Of these, wet silica is preferred because it is most striking in the balance of the improvement of fracture resistance, wet grip property and low rolling resistance. Silica can be used in one kind or in combination of two or more kinds.

The rubber composition of the present embodiment contains at least either selected from the group consisting of carbon black and silica, preferably in an amount of 20 to 120 parts by mass relative to 100 parts by mass of the rubber component and, from the standpoints of reinforcement and resultant property improvements, more preferably in an amount of 25 to 100 parts by mass. When the amount of either or both of carbon black and silica is small, improvements in fracture resistance, etc. tend to be insufficient. Meanwhile, when the amount is large, the processability of rubber composition tends to be low.

When, in the rubber composition of the present embodiment, silica is used as a reinforcing filler, it is preferred that a silane coupling agent is compounded for further enhancement of reinforcing effect. As the silane coupling agent, there can be mentioned, for example, bis(3-triethoxysilylpropyl) tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, and dimethoxymethylsilylpropylbenzothiazolyl tetrasulfide. Of these, bis(3-triethoxysilylpropyl)polysulfide and 3-trimethoxysilylpropylbenzothiazyl tetrasulfide are preferred for improved reinforcement, etc. These silane coupling agents can be used singly or in combination of two or more kinds.

The use amount of the silane coupling agent differs depending upon the kind of silane coupling agent used, etc. but is preferably 1 to 20 mass %, more preferably 3 to 15 mass % relative to 100 mass % of silica. When the use amount is smaller than 1 mass %, the effect of the coupling agent tends to be hardly exhibited. Meanwhile, when the amount is larger than 20 mass %, the gelling of the rubber component tends to appear.

To the rubber composition of the present embodiment may be added as necessary various chemicals and additives ordinarily used in the rubber industry, as long as the purpose of the present invention is not impaired. As various chemicals and additives which may be added to the rubber composition of the present embodiment, there can be mentioned, for example, a vulcanizing agent, a vulcanization aid, a processing aid, a vulcanization accelerator, a process oil, an antioxidant, an anti-scorching agent, zinc white and stearic acid.

As the vulcanizing agent, sulfur is used ordinarily. The use amount thereof is preferably 0.1 to 3 parts by mass, more preferably 0.5 to 2 parts by mass relative to 100 parts by mass of the raw material rubber (rubber component). As the vulcanization aid and the processing aid, stearic acid is used generally. The use amount thereof is 0.5 to 5 parts by mass relative to 100 parts by mass of the raw material rubber (rubber component). The vulcanization accelerator is not particularly restricted but there can be preferably mentioned thiazole type vulcanization accelerators such as M (2-mercaptobenzothiazole), DM (dibenzothiazyl disulfide), CZ (N-cyclohexyl-2-benzothiazylsulfenamide) and the like. The use amount thereof is ordinarily 0.1 to 5 parts by mass, preferably 0.2 to 3 parts by mass relative to 100 parts by mass of the raw material rubber (rubber component).

The rubber composition of the present invention can be produced by conducting kneading by using a kneader such as open type kneader (e.g. roll), closed type kneader (e.g. Banbury mixer) or the like. The rubber composition, by molding and subsequent vulcanization, can be used as various rubber products. The rubber composition of the present embodiment is suitable for tire applications (e.g. tire tread, under tread, carcas, side wall and bead) and applications (e.g. rubber vibration insulator, antiglare material, belt, hose and other industrial products). The rubber composition of the present embodiment is used particularly preferably as a rubber for tire tread.

EXAMPLES

The present invention is described specifically below by way of Examples. However, the present invention is in no way restricted to these Examples. In Examples and Comparative Examples, "parts" and "%" are based on mass unless otherwise specified. The measurement methods and evaluation methods of properties are shown below.

[Vinyl Content (%)]
Determined by 270 MHz $^1$H-NMR.
[Bound Styrene Content (%)]
Determined by 270 MHz $^1$H-NMR.
[Glass Transition Temperature (° C.)]
Determined based on ASTM D 3418.
[Mooney Viscosity (ML1+4, 100° C.)]
Determined based on JIS K 6300, using an L rotor under the conditions of preheating=1 minute, rotor operating time=4 minutes, and temperature=100° C.
[Evaluation and Measurement of Properties of Rubber Composition]
A rubber composition (vulcanized) was prepared using a polymer obtained in each of Examples and Comparative Examples, and was measured for the following test items (a) to (d).
(a) Tensile Strength (300% Modulus)
Measured based on JIS K 6301 and expressed as index. A larger index means a higher (superior) tensile strength.
(b) Tan δ (0° C.)
A rubber composition (vulcanized) was used as a test sample and measured for this item, using a dynamic spectrometer (a product of U.S. Rheometrics) under the conditions of tensile strain=0.1%, frequency=10 Hz, and 0° C. The obtained value was expressed as index. A larger index means a larger (superior) wet skid resistance.
(c) Tan δ (50° C.)
A rubber composition (vulcanized) was used as a test sample and measured for this item, using a dynamic spectrometer (a product of U.S. Rheometrics) under the conditions of tensile strain=1%, frequency=10 Hz, and 50° C. The obtained value was expressed as index. A larger index means a smaller (superior) rolling resistance.
(d) Abrasion Resistance (Lambourn Abrasion Resistance Index)
An abrasion amount at a slip ratio of 25% was measured using a Lambourn abrasion tester. The temperature of measurement was room temperature. The abrasion was expressed as an index. A larger index means a superior abrasion resistance.

[1-1] Example 1

Synthesis of Polymer A

Into an autoclave reactor having an internal volume of 5 liters, whose inside had been purged with nitrogen, were fed 2,750 g of cyclohexane, 41.3 g of tetrahydrofuran, 125 g of styrene and 365 g of 1,3-butadiene. The temperature of the reactor contents was adjusted to 10° C. Then, 215 mg of n-butyl lithium was added and polymerization was initiated. The polymerization was conducted under adiabatic conditions and the maximum temperature reached 85° C.

When the polymerization conversion reached 99%, 10 g of 1,3-butadiene was added and polymerization was further conducted for 5 minutes. Small amount of the polymer solution in the reactor was taken and pored into 30 g of a cyclohexane solution containing 1 g of methanol. Then, 600 mg of methyltriethoxysilane was added as an alkoxysilane compound (an agent for primary modification), and a modification reaction was conducted for 15 minutes [(step (a)]. Then, 3.97 g of bis(2-ethylhexanoate) zirconium oxide was added as a condensation accelerator containing a metal element, followed by stirring for 15 minutes [(step (b1))]. Then, 5 ml of hydrochloric acid as an inorganic acid was added to the polymer solution, and further 2,6-di-tert-butyl-p-cresol was added [(step (b2)]. Then, steam stripping was conducted for solvent removal; the resulting polymer was dried using a hot roll controlled at 110° C., to obtain a raw rubber copolymer (a modified conjugated diene based (co)polymer, hereinafter referred to as "polymer A"). The composition and properties of the polymer are shown in Table 1 and Table 2.

TABLE 1

| | Examples | | | | | | | | |
|---|---|---|---|---|---|---|---|---|---|
| | 1 | 2 | 3 | 4 | 5 | 6 | 7 | 8 | 9 |
| Polymers | A | B | C | D | E | F | G | H | I |
| Polymerization formulation | | | | | | | | | |
| Hydrocarbon solvent | | | | | | | | | |
| Cyclohexane (g) | 2750 | 2750 | 2750 | 2750 | 2750 | 2750 | 2750 | 2750 | 2750 |
| Vinyl content-adjusting agent | | | | | | | | | |
| Tetrahydrofuran (g) | 41.3 | 41.3 | 41.3 | 41.3 | 41.3 | 41.3 | 41.3 | 41.3 | 41.3 |
| Monomers | | | | | | | | | |
| 1,3-Butadiene (g) | 375 | 375 | 375 | 375 | 375 | 375 | 375 | 375 | 375 |
| Styrene (g) | 125 | 125 | 125 | 125 | 125 | 125 | 125 | 125 | 125 |
| Alkali metal-based initiator | | | | | | | | | |
| n-Butyl lithium (mg) | 215 | 215 | 215 | 215 | 215 | 215 | 215 | 215 | 215 |
| Alkoxysilane compounds (agents for primary modification) | | | | | | | | | |
| MTES *1 (mg) | 600 | 600 | 600 | — | — | — | — | — | — |
| GPMOS *2 (mg) | — | — | — | 803 | — | — | — | — | — |
| N—Si-1 *3 (mg) | — | — | — | — | 832 | — | — | — | — |
| N—Si-1 *4 (mg) | — | — | — | — | — | 1231 | 1231 | — | — |
| N—Si-1 *5 (mg) | — | — | — | — | — | — | — | 1019 | 1019 |
| Condensation accelerators | | | | | | | | | |
| Bis(2-ethylhexanoate) zirconium oxide (g) | 3.97 | — | — | 3.97 | 3.97 | 3.97 | — | 3.97 | — |
| Tetra(2-ethylhexyloxy) titanium (g) | — | 6.45 | — | — | — | — | 6.45 | — | 6.45 |
| Tri-sec-butoxy aluminum (g) | — | — | 2.49 | — | — | — | — | — | — |
| Inorganic acid | | | | | | | | | |
| Hydrochloric acid (ml) | 5 | 5 | 5 | 5 | 5 | 5 | 5 | 5 | 5 |

*1 Methyltriethoxysilane
*2 3-Glycidoxypropyltrimethoxysilane
*3 3-Isocyanatepropyltrimethoxysilane
*4 N,N-bis(trimethylsilyl)aminopropyltriethoxysilane
*5 N-(1,3-dimethylbutylidene)-3-(triethoxysilyl)-2-propaneamine

TABLE 2

| | Examples | | | | | | | | |
|---|---|---|---|---|---|---|---|---|---|
| | 1 | 2 | 3 | 4 | 5 | 6 | 7 | 8 | 9 |
| Polymers | A | B | C | D | E | F | G | H | I |
| Characteristics of polymer molecule | | | | | | | | | |
| Vinyl content (%) | 56 | 55 | 55 | 55 | 56 | 55 | 56 | 55 | 55 |
| Bound styrene content (%) | 20 | 20 | 20 | 20 | 20 | 20 | 20 | 20 | 20 |
| Glass transition temperature (° C.) | −35 | −35 | −35 | −35 | −35 | −35 | −35 | −35 | −35 |
| Mooney viscosity (ML1 + 4, 100° C.) | 84 | 72 | 68 | 86 | 83 | 82 | 87 | 75 | 77 |

[1-2] Example 2

Synthesis of Polymer B

A polymer B was obtained in the same manner as in Example 1 except that, in Example 1, 3.97 g of bis(2-ethylhexanoate) zirconium oxide was changed to 6.45 g of tetra (2-ethylhexyloxy) titanium. The formulation and properties of the polymer B are shown in Table 1 and Table 2.

[1-3] Example 3

Synthesis of Polymer C

A polymer C was obtained in the same manner as in Example 1 except that, in Example 1, 3.97 g of bis(2-ethylhexanoate) zirconium oxide was changed to 2.49 g of tri-sec-butoxy aluminum. The formulation and properties of the polymer C are shown in Table 1 and Table 2.

[1-4] Example 4

Synthesis of Polymer D

A polymer D was obtained in the same manner as in Example 1 except that, in Example 1, the agent for primary modification was changed to 803 mg of 3-glycidoxypropyltrimethoxysilane. The formulation and properties of the polymer D are shown in Table 1 and Table 2.

[1-5] Example 5

Synthesis of Polymer E

A polymer E was obtained in the same manner as in Example 1 except that, in Example 1, the agent for primary modification was changed to 832 mg of 3-isocyanatepropyl-trimethoxysilane. The formulation and properties of the polymer E are shown in Table 1 and Table 2.

[1-6] Example 6

Synthesis of Polymer F

A polymer F was obtained in the same manner as in Example 1 except that, in Example 1, the agent for primary modification was changed to 1,231 mg of N,N-bis(trimethylsilyl)aminopropyltriethoxysilane. The formulation and properties of the polymer F are shown in Table 1 and Table 2.

[1-7] Example 7

Synthesis of Polymer G

A polymer G was obtained in the same manner as in Example 6 except that, in Example 6, 3.97 g of bis(2-ethylhexanoate) zirconium oxide was changed to 6.45 g of tetra (2-ethylhexyloxy) titanium. The formulation and properties of the polymer G are shown in Table 1 and Table 2.

[1-8] Example 8

Synthesis of Polymer H

A polymer H was obtained in the same manner as in Example 1 except that, in Example 1, the agent for primary modification was changed to 1,019 mg of N-(1,3-dimethylbutylidene)-3-(triethoxysilyl)-2-propaneamine. The formulation and properties of the polymer H are shown in Table 1 and Table 2.

[1-9] Example 9

Synthesis of Polymer I

A polymer I was obtained in the same manner as in Example 8 except that, in Example 8, 3.97 g of bis(2-ethylhexanoate) zirconium oxide was changed to 6.45 g of tetra (2-ethylhexyloxy) titanium. The formulation and properties of the polymer I are shown in Table 1 and Table 2.

[1-10] Example 10

Synthesis of Polymer J

A polymer J was obtained in the same manner as in Example 7 except that, in Example 7, 5 ml of hydrochloric acid was changed to 2.80 g of silicon tetrachloride (a metal halide). The formulation and properties of the polymer J are shown in Table 3 and Table 4.

TABLE 3

| | | Examples | | | |
|---|---|---|---|---|---|
| | 10 | 11 | 12 | 13 | 14 |
| Polymers | J | K | L | M | N |
| Polymerization formulation | | | | | |
| Hydrocarbon solvent | | | | | |
| Cyclohexane (g) | 2750 | 2750 | 2750 | 2750 | 2750 |
| Vinyl content-adjusting agent | | | | | |
| Tetrahydrofuran (g) | 41.3 | 41.3 | 41.3 | 41.3 | 41.3 |
| Monomers | | | | | |
| 1,3-Butadiene (g) | 375 | 375 | 375 | 375 | 375 |
| Styrene (g) | 125 | 125 | 125 | 125 | 125 |
| Alkali metal-based initiator | | | | | |
| n-Butyl lithium (mg) | 215 | 215 | 215 | 215 | 215 |
| Alkoxysilane compound (agent for primary Modification) | | | | | |
| N—Si-1 *1 (mg) | 1231 | 1231 | 1231 | 1231 | 1231 |

TABLE 3-continued

|  | Examples | | | | |
| --- | --- | --- | --- | --- | --- |
|  | 10 | 11 | 12 | 13 | 14 |
| Condensation accelerator | | | | | |
| Tetra(2-ethylhexyloxy) titanium (g) | 6.45 | 6.45 | 6.45 | 6.45 | 6.45 |
| Metal halides | | | | | |
| Silicon tetrachloride (g) | 2.80 | — | — | — | — |
| Tin tetrachloride (g) | — | 4.23 | — | — | — |
| Titanium tetrachloride (g) | — | — | 3.13 | — | — |
| Diethyl aluminum chloride (g) | — | — | — | 1.99 | — |
| Phosphorus trichloride (g) | — | — | — | — | 2.27 |

*1 N,N-bis(trimethylsilyl)aminopropyltriethoxysilane

TABLE 4

|  | Examples | | | | |
| --- | --- | --- | --- | --- | --- |
|  | 10 | 11 | 12 | 13 | 14 |
| Polymers | J | K | L | M | N |
| Characteristic of polymer molecule | | | | | |
| Vinyl content (%) | 55 | 56 | 55 | 55 | 55 |
| Bound styrene content (%) | 20 | 20 | 20 | 20 | 20 |
| Glass transition temperature (° C.) | −35 | −34 | −35 | −35 | −35 |
| Mooney viscosity (ML1 + 4, 100° C.) | 77 | 76 | 77 | 74 | 73 |

[1-11] Example 11

Synthesis of Polymer K

A polymer K was obtained in the same manner as in Example 7 except that, in Example 7, 5 ml of hydrochloric acid was changed to 4.23 g of tin tetrachloride. The formulation and properties of the polymer K are shown in Table 3 and Table 4.

[1-12] Example 12

Synthesis of Polymer L

A polymer L was obtained in the same manner as in Example 7 except that, in Example 7, 5 ml of hydrochloric acid was changed to 3.13 g of titanium tetrachloride. The formulation and properties of the polymer L are shown in Table 3 and Table 4.

[1-13] Example 13

Synthesis of Polymer M

A polymer M was obtained in the same manner as in Example 7 except that, in Example 7, 5 ml of hydrochloric acid was changed to 1.99 g of diethyl aluminum chloride. The formulation and properties of the polymer M are shown in Table 3 and Table 4.

[1-14] Example 14

Synthesis of Polymer N

A polymer N was obtained in the same manner as in Example 7 except that, in Example 7, 5 ml of hydrochloric acid was changed to 2.27 g of phosphorus trichloride. The formulation and properties of the polymer N are shown in Table 3 and Table 4.

[1-15] Comparative Examples 1 to 3

Synthesis of Polymers O to Q

Copolymers O, P and Q were obtained in the same manner as in Example 1 except that, the inorganic acid used in Example 1 was changed to one of the additives shown in Table 5 (no additive was used in Comparative Example 1). The formulations and properties of the polymers obtained are shown in Table 5 and Table 6.

TABLE 5

|  | Comparative Examples | | | | | |
| --- | --- | --- | --- | --- | --- | --- |
|  | 1 | 2 | 3 | 4 | 5 | 6 |
| Polymers | O | P | Q | R | S | T |
| Polymerization formulation | | | | | | |
| Hydrocarbon solvent | | | | | | |
| Cyclohexane (g) | 2750 | 2750 | 2750 | 2750 | 2750 | 2750 |
| Vinyl content-adjusting agent | | | | | | |
| Tetrahydrofuran (g) | 41.3 | 41.3 | 41.3 | 41.3 | 41.3 | 41.3 |
| Monomers | | | | | | |
| 1,3-Butadiene (g) | 375 | 375 | 375 | 375 | 375 | 375 |
| Styrene (g) | 125 | 125 | 125 | 125 | 125 | 125 |

TABLE 5-continued

| | Comparative Examples | | | | | |
|---|---|---|---|---|---|---|
| | 1 | 2 | 3 | 4 | 5 | 6 |
| Alkali metal-based initiator | | | | | | |
| n-Butyl lithium (mg) | 215 | 215 | 215 | 215 | 215 | 215 |
| Alkoxysilane compounds (agents for primary Modification) | | | | | | |
| MTES *1 (mg) | 600 | 600 | 600 | — | — | — |
| N—Si-1 *2 (mg) | — | — | — | 1231 | 1232 | 1233 |
| Additives | | | | | | |
| Tetra(2-ethylhexyloxy) titanium (g) | — | 6.45 | — | — | 6.45 | — |
| Tri-sec-butoxy aluminum (g) | — | — | 2.49 | — | — | 2.49 |

*1 Methyltriethoxysilane
*2 N,N-bis(trimethylsilyl)aminopropyltriethoxysilane

TABLE 6

| | Comparative Examples | | | | | |
|---|---|---|---|---|---|---|
| | 1 | 2 | 3 | 4 | 5 | 6 |
| Polymers | O | P | Q | R | S | T |
| Characteristic of polymer molecule | | | | | | |
| Vinyl content (%) | 55 | 55 | 55 | 56 | 55 | 55 |
| Bound styrene content (%) | 20 | 20 | 20 | 20 | 20 | 20 |
| Glass transition temperature (° C.) | −35 | −35 | −35 | −34 | −35 | −35 |
| Mooney viscosity (ML1 + 4, 100° C.) | 33 | 36 | 35 | 14 | 15 | 14 |

[1-16] Comparative Examples 4 to 6

Synthesis of Polymers R to T

Polymers R, S and T were obtained in the same manner as in Example 6 except that the inorganic acid used in Example 6 was changed to one of the additives shown in Table 5 (no additive was used in Comparative Example 4). The formulations and properties of the polymers obtained are shown in Table 5 and Table 6.

[2] Preparation of Rubber Compositions (Vulcanized Compositions)

Using each of the polymers (polymers A to T) obtained in Examples 1 to 14 and Comparative Examples 1 to 6, compounding was made according to the "compounding recipe of rubber composition" shown in Table 7, and kneading was conducted using a plastmill to prepare silica-containing rubber compositions (unvulcanized compositions). Then, each unvulcanized rubber composition was vulcanized at 150° C. for 30 minutes to obtain rubber compositions (vulcanized compositions). Each rubber composition (vulcanized) was evaluated and measured for the above-mentioned (a) tensile strength, (b) tan δ (0° C.), (c) tan δ (50° C.) and (d) abrasion resistance. The results are shown in Table 8 and Table 9. Incidentally, in Table 8 and Table 9, the measured value of each test item, of Comparative Example 1 was taken as 100, and a larger value means a better property.

TABLE 7

| Compounding recipe | Parts by mass |
|---|---|
| Polymer | 70 |
| Polybutadiene rubber *1 | 30 |
| Extender oil *2 | 37.5 |
| Silica *3 | 70 |
| Carbon black *4 | 5.6 |
| Silane coupling agent *5 | 5.6 |
| Stearic acid | 2 |
| Anti-oxidant *6 | 1 |
| Zinc oxide | 3 |
| Vulcanization accelerator NS *7 | 1.5 |
| Vulcanization accelerator CZ *8 | 1.8 |
| Sulfur | 1.5 |

*1 BR 01, a product of JSR
*2 Aromax #3, a product of Fuji Kosan Company, Ltd.
*3 Nipsil AQ, a product of Nippon Silica Industrial Co., Ltd.
*4 Dia Black N 339, a product of Mitsubishi Chemical
*5 Si 69, a product of Degusa
*6 NOCRAC 810 NA, a product of Ouchi Shinko Chemical Industrial Co., Ltd.
*7 NOCCELER NS•F, a product of Ouchi Shinko Chemical Industrial Co., Ltd.
*8 NOCCELER CZ, a product of Ouchi Shinko Chemical Industrial Co., Ltd.

TABLE 8

| Properties of rubber composition | Examples | | | | | | | | | |
|---|---|---|---|---|---|---|---|---|---|---|
| | 1 | 2 | 3 | 4 | 5 | 6 | 7 | 8 | 9 | 10 |
| Polymers | A | B | C | D | E | F | G | H | I | J |
| Tensile strength (index) | 109 | 110 | 109 | 111 | 114 | 118 | 119 | 115 | 113 | 120 |
| Tan δ (0° C.) (index) | 114 | 114 | 114 | 116 | 116 | 126 | 128 | 122 | 119 | 131 |
| Tan δ (50° C.) (index) | 114 | 115 | 114 | 115 | 118 | 129 | 133 | 121 | 120 | 135 |
| Abrasion resistance (index) | 112 | 111 | 111 | 113 | 117 | 122 | 124 | 119 | 118 | 127 |

TABLE 9

| Properties of rubber composition | Examples | | | | Comparative Examples | | | | | |
|---|---|---|---|---|---|---|---|---|---|---|
| | 11 | 12 | 13 | 14 | 1 | 2 | 3 | 4 | 5 | 6 |
| Polymers | K | L | M | N | O | P | Q | R | S | T |
| Tensile strength (index) | 118 | 119 | 118 | 118 | 100 | 106 | 105 | 113 | 115 | 114 |
| Tan δ (0° C.) (index) | 129 | 130 | 128 | 129 | 100 | 108 | 106 | 116 | 120 | 119 |
| Tan δ (50° C.) (index) | 133 | 133 | 134 | 133 | 100 | 107 | 105 | 117 | 121 | 118 |
| Abrasion resistance (index) | 124 | 125 | 124 | 122 | 100 | 106 | 103 | 110 | 116 | 113 |

[3] Discussion

As shown in Tables 2, 4 and 6, the polymers A to N of Examples 1 to 14, which were obtained by subjecting a primarily modified polymer obtained by a primary modification reaction using an alkoxysilane compound, to a reaction with a condensation accelerator containing a metal element [a step (b1)] and then subjecting the polymer after the step (b1) to a reaction with hydrochloric acid (as an inorganic acid) or with bis(2-ethylhexanoate) zirconium oxide, tetra(2-ethylhexyloxy) titanium, or tri-sec-butoxy aluminum (each as a metal halide) [a step (b2)], had each a high Mooney viscosity, as compared with the polymers O to T of Comparative Examples 1 to 6.

As is clear from the evaluation results of (a) tensile strength, (b) tan δ (0° C.), (c) tan δ (50° C.) and (d) abrasion resistance, the rubber compositions (vulcanized compositions) using each of the polymers A to N of Examples 1 to 14 are excellent in tensile strength, small in rolling resistance, and largely improved in wet skid resistance and abrasion resistance. Incidentally, in each of Examples 1 to 14, even when the order of the step (b1) and the step (b2) has been reversed, a polymer having a high Mooney viscosity and excellent shape stability can be obtained.

Industrial Applicability

With the method for producing a modified conjugated diene based (co)polymer, of the present invention, there can be obtained a modified conjugated diene based (co)polymer having a high Mooney viscosity and excellent shape stability. With such a modified conjugated diene based (co)polymer, there can be obtained a rubber composition (vulcanized composition) which is excellent in tensile strength, small in rolling resistance, and satisfactory in wet skid resistance and abrasion resistance. Therefore, the rubber composition containing the modified conjugated diene based (co)polymer obtained by the present invention can be used, for example, in tire applications (e.g. tire tread, under tread, carcas, side wall and bead) as well as in applications (e.g. rubber vibration insulator, antiglare material, belt, hose and other industrial products). The rubber composition of the present embodiment is used particularly preferably as a rubber for tire tread.

The invention claimed is:

1. A method for producing a modified conjugated diene based (co)polymer, comprising:
   (a) obtaining a primarily modified polymer by carrying out a primary modification reaction wherein at least one member selected from the group consisting of an alkoxysilane compound and a silanol compound is introduced into the active alkali metal terminal of a conjugated diene based (co)polymer having an active alkali metal terminal, wherein the conjugated diene based (co)polymer is obtained by subjecting at least a diene monomer to anionic polymerization in a hydrocarbon solvent comprising an alkali metal-based initiator, and
   (b) subjecting the above-obtained primarily modified polymer to reactions comprising (b1) and (b2) to obtain a secondarily modified polymer (a modified conjugated diene based (co)polymer),
   (b1): a reaction with a condensation accelerator comprising a metal element, and
   (b2): a reaction with at least one member selected from the group consisting of inorganic acids and metal halides.

2. The method for producing a modified conjugated diene based (co)polymer, according to claim 1, wherein the condensation accelerator comprising a metal element is a metal compound comprising at least one kind of metal selected from the group consisting of the groups 2 to 15 of periodic table.

3. The method for producing a modified conjugated diene based (co)polymer, according to claim 2, wherein the condensation accelerator comprising a metal element is an alkoxide, a carboxylic acid salt, or an acetyl acetonate complex salt, of the metal.

4. The method for producing a modified conjugated diene based (co)polymer, according to claim 1, wherein the metal halide is a metal halide containing at least one kind of metal selected from the group consisting of the groups 2 to 15 of periodic table.

5. The method for producing a modified conjugated diene based (co)polymer, according to claim 1, wherein the alkoxysilane compound is a compound comprising at least one member selected from the group consisting of the compounds represented by following general formula (I), the compounds represented by following general formula (II), and partial condensation products of these compounds, wherein

[Formula 1]

$R^1$ and $R^2$ are each independently a mono-valent aliphatic hydrocarbon group having 1 to 20 carbon atoms or a mono-valent aromatic hydrocarbon group having 6 to 18 carbon atoms; a is an integer of 0 to 2; when there are a plurality of $OR^2$s, the plurality of $OR^2$s may be the same or different from each other; and there is no active proton in the molecule

[Formula 2]

$A^1$ is a mono-valent group having at least one functional group selected from the group consisting of epoxy, isocyanate, imine, carboxylic acid ester, carboxylic acid anhydride, cyclic tertiary amine, acyclic tertiary amine, pyridine, silazane and disulfide; $R^3$ is a single bond or a bi-valent hydrocarbon group; $R^4$ and $R^5$ are each independently a mono-valent aliphatic hydrocarbon group having 1 to 20 carbon atoms or a mono-valent aromatic hydrocarbon group having 6 to 18 carbon atoms; b is an integer of 0 to 2; when there are a plurality of $OR^5$s, the plurality of $OR^5$s may be the same or different from each other; and there is no active proton in the molecule.

6. The method for producing a modified conjugated diene based (co)polymer, according to claim 1, wherein the conjugated diene based (co)polymer is obtained by subjecting the diene monomer and other monomer comprising an aromatic vinyl compound to anionic polymerization.

7. The method for producing a modified conjugated diene based (co)polymer, according to claim 1, wherein the conjugated diene based (co)polymer is obtained by subjecting, to anionic polymerization, at least one kind of diene monomer selected from the group consisting of 1,3-butadiene, isoprene and 2,3-dimethyl-1,3-butadiene.

8. The method for producing a modified conjugated diene based (co)polymer, according to claim 6, wherein the aromatic vinyl compound is styrene.

9. A modified conjugated diene based (co)polymer obtained by the method for producing a modified conjugated diene based (co)polymer, according to claim 1.

10. A rubber composition comprising, as a rubber component, the modified conjugated diene based (co)polymer according to claim 9.

11. The rubber composition according to claim 10, which further comprises at least one selected from the group consisting of silica and carbon black.

12. The rubber composition according to claim 11, comprising a rubber component comprising 20 mass % or more of the modified conjugated diene based (co)polymer and at least one selected from the group consisting of silica and carbon black in an amount of 20 to 120 parts by mass relative to 100 parts by mass of the rubber component.

13. The rubber composition according to claim 10, wherein the rubber component consists of the modified conjugated diene based (co)polymer and other rubber component, and the content of the modified conjugated diene based (co)polymer is 20 to 100 mass % and the content of the other rubber component is 0 to 80 mass % (the modified conjugated diene based (co)polymer+the other rubber component= 100 mass %).

14. The rubber composition according to claim 13, wherein the other rubber component is at least one kind of rubber component selected from the group consisting of natural rubber, synthetic isoprene rubber, butadiene rubber, styrene-butadiene rubber, ethylene-α-olefin copolymer rubber, ethylene-α-olefin-diene copolymer rubber, acrylonitrile-butadiene copolymer rubber, chloroprene rubber and halogenated butyl rubber.

15. The method for producing a modified conjugated diene based (co)polymer, according to claim 1, wherein (b2) is a reaction with an inorganic acid.

16. The method for producing a modified conjugated diene based (co)polymer, according to claim 1, wherein (b2) is a reaction with an metal halide.

17. The method for producing a modified conjugated diene based (co)polymer, according to claim 1, wherein (b2) is a reaction with an metal halide, wherein the metal halide contains at least one kind of metal selected from the group consisting of the groups 2 to 15 of periodic table.

18. The method for producing a modified conjugated diene based (co)polymer, according to claim 1, wherein the alkoxysilane compound is introduced into the active alkali metal terminal of the conjugated diene based (co)polymer.

19. The method for producing a modified conjugated diene based (co)polymer, according to claim 1, wherein the silanol compound is introduced into the active alkali metal terminal of the conjugated diene based (co)polymer.

20. The method for producing a modified conjugated diene based (co)polymer, according to claim 1, wherein the metal element of the condensation accelerator is titanium, zirconium, aluminum, bismuth or tin.

\* \* \* \* \*